United States Patent
Jemison et al.

(10) Patent No.: US 11,713,421 B2
(45) Date of Patent: Aug. 1, 2023

(54) PROCESS FOR PARTIAL UPGRADING OF HEAVY OIL

(71) Applicant: The Texas A&M University System, College Station, TX (US)

(72) Inventors: Howard Jemison, Houston, TX (US); David Staack, College Station, TX (US); Kunpeng Wang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 373 days.

(21) Appl. No.: 17/048,637

(22) PCT Filed: Apr. 19, 2019

(86) PCT No.: PCT/US2019/028338
§ 371 (c)(1),
(2) Date: Oct. 19, 2020

(87) PCT Pub. No.: WO2019/204739
PCT Pub. Date: Oct. 24, 2019

(65) Prior Publication Data
US 2021/0155856 A1    May 27, 2021

Related U.S. Application Data

(60) Provisional application No. 62/660,718, filed on Apr. 20, 2018.

(51) Int. Cl.
*C10G 15/12* (2006.01)
*B01D 3/14* (2006.01)
*C10G 55/04* (2006.01)

(52) U.S. Cl.
CPC ............... *C10G 15/12* (2013.01); *B01D 3/14* (2013.01); *C10G 55/04* (2013.01); *B01D 2257/60* (2013.01); *C10G 2300/4081* (2013.01)

(58) Field of Classification Search
CPC ................... C10G 15/12; C10G 55/04; C10G 2300/4081; C10G 47/00; C10G 55/02;
(Continued)

(56) References Cited

U.S. PATENT DOCUMENTS 4,105,888 A    8/1978    Fey
4,941,965 A    7/1990    Amouroux et al.
(Continued)

FOREIGN PATENT DOCUMENTS

| CN | 107880927 A | 4/2018 |
| TW | 275636 B | 3/2007 |
| WO | WO-2018/005141 A1 | 1/2018 |

OTHER PUBLICATIONS

International Search Report and Written Opinion on International Patent Application No. PCT/US2019/028338 dated Aug. 5, 2019 (13 pages).

(Continued)

*Primary Examiner* — Randy Boyer
*Assistant Examiner* — Juan C Valencia
(74) *Attorney, Agent, or Firm* — Foley & Lardner LLP (57) ABSTRACT

A process for continuously upgrading heavy oil to produce light hydrocarbon gases which are recycled in the process as a carrier gas used in spark-discharge hydrocarbon cracking within the process. The process also produces light hydrocarbon liquids which are used to upgrade the heavy oil. An apparatus for continuously upgrading heavy oil to produce light hydrocarbon gases which are recycled in the as a carrier gas used in spark-discharge hydrocarbon cracking within the (Continued)

apparatus. The apparatus also produces light hydrocarbon liquids which are used to upgrade the heavy oil.

19 Claims, 2 Drawing Sheets

(58) Field of Classification Search
CPC .. C10G 2300/42; B01D 3/14; B01D 2257/60; B01J 4/002; B01J 2219/083; B01J 2219/0835; B01J 2219/0847; B01J 19/088
See application file for complete search history.

(56) References Cited

U.S. PATENT DOCUMENTS

| | | |
|---|---|---|
| 6,852,215 B2 | 2/2005 | Wen et al. |
| 9,074,143 B2 | 7/2015 | McGehee et al. |
| 2013/0161232 A1 | 6/2013 | Staack et al. |
| 2014/0262744 A1* | 9/2014 | Locke .................... B01J 19/088 |
| | | 422/186.04 |
| 2015/0376513 A1 | 12/2015 | Van Wees et al. |
| 2016/0177190 A1 | 6/2016 | Novoselov |
| 2017/0306252 A1* | 10/2017 | Malek Abbaslou ... C10G 47/26 |

OTHER PUBLICATIONS

Jahanmiri, A., et al., "Naphtha cracking through a pulsed DBD plasma reactor: Effect of applied voltage, pulse repetition frequency and electrode material," Chem. Eng. J., 191:416-425 (2012) (10 pages).

* cited by examiner

PROCESS FOR PARTIAL UPGRADING OF HEAVY OIL

CROSS REFERENCE TO RELATED APPLICATION

This application is a U.S. National Stage Application under 35 U.S.C. § 371 of International Patent Application No. PCT/US2019/028338, filed on Apr. 19, 2019, which claims priority to U.S. Provisional Patent Application No. 62/660,718 entitled "PROCESS FOR PARTIAL UPGRADING OF HEAVY OIL," filed Apr. 20, 2018, each of which is herein incorporated by reference in its entirety for all purposes.

FIELD

The present technology generally relates to a process for cracking crude oil and other heavy liquid hydrocarbon materials using a spark discharge.

BACKGROUND

Heavy oil (including extra heavy oil and bitumen) represents half of the global oil endowment of oil, but only a tiny fraction has been produced to date (USGS Geological Survey Fact Sheet 70-03). Presently, at heavy oil production sites, the produced heavy oil must be immediately upgraded or diluted with lighter hydrocarbons (naphtha, natural gas condensate, or other lower molecular weight saturated hydrocarbons). This required dilution facilitates the separation of the oil from produced water and the reduction of product density and viscosity for transportation (pipeline, rail, ship, etc.). Dilution may require 20-40% of the total volume of the salable crude oil product, and the diluent must be purchased and delivered to the production processing facilities.

North America has large reserves of heavy oil and recognizes the value that partial upgrading will bring to heavy oil production. Several competing technologies are being developed to satisfy the demand for more economical heavy oil production. Almost all current methods involve modifications of existing refinery technology, thus including the same severe operating conditions and high capital/operating costs.

There is a need for processes and devices to streamline the transportation and processing of heavy oil simultaneously to produce high value, upgraded oil and hydrocarbon products.

SUMMARY

In one aspect, provided is an apparatus for continuously upgrading the quality of heavy oil. The apparatus may comprise a heavy oil feed connected to a heat exchanger for conveying heavy oil through the heat exchanger. The heavy oil feed may be continuous with a first line connecting the heat exchanger with a first trim exchanger. The apparatus may also comprise a reactor with a second line configured to deliver heavy oil thereto. The second line may run through the first trim exchanger and may be continuous with the first line. The apparatus may moreover comprise a separator connected to the reactor by a third line. The separator may be connected to a fourth line that splits into a recycling line and a fifth line. The recycling line may merge with the second line. The fifth line may connect to the heat exchanger. A sixth line may be connected to the separator and may split into a produced light liquids line and a seventh line. The seventh line may connect to a blender. The apparatus may additionally comprise a second trim exchanger, connected to the heat exchanger by an eighth line. The eighth line may be continuous with the fifth line. The apparatus may further comprise a ninth line connecting the blender and the second trim exchanger. The apparatus may furthermore comprise an upgraded oil line connected to the blender, for removing upgraded oil from the apparatus. The apparatus may also comprise a compressor. A tenth line may be connected to the separator and may split into a recycle gas line and an eleventh line. The recycle gas line may connect to the compressor and the eleventh line may connect to a power generator. The apparatus may moreover comprise a light hydrocarbon gas feed for conveying fresh light hydrocarbon gas to the reactor. The apparatus may additionally comprise a twelfth line connecting the compressor to the light hydrocarbon gas feed. The apparatus may further comprise a power line connecting power generator to the reactor.

In another aspect, provided is an apparatus for continuously upgrading heavy oil to produce upgraded oil. The apparatus may comprise a heavy oil feed connected to a heat exchanger for conveying heavy oil through the heat exchanger. The heavy oil feed may be continuous with a first line connecting the heat exchanger with a first trim exchanger. The apparatus may also comprise a separator connected to the first trim exchanger by a second line, which may be continuous with the first line. The apparatus may moreover comprise a third line connected to the separator. The third line may branch into a heavy oil line and a fourth line. The heavy oil line may run through the heat exchanger and may be continuous with a fifth line connected to a second trim exchanger. The fourth line may connect to a reactor. A sixth line may connect the reactor with the separator. The apparatus may additionally comprise a blender connected to the second trim exchanger by a seventh line. An upgraded oil line for removing upgraded oil from the apparatus may be connected to the blender. The apparatus may further comprise an eighth line connected to the separator. The eighth line may branch into a light hydrocarbon liquid line and a produced light liquid line. The light hydrocarbon liquid line may connect to the blender. The apparatus may furthermore comprise a ninth line connected to the separator. The ninth line may branch into a tenth line and a recycle gas line. The tenth line may be connected to a power generator. The recycle gas line may be connected to a compressor, which may be connected to an eleventh line. The eleventh line may merge with a light hydrocarbon gas feed, which may be configured to convey fresh light hydrocarbon gas to the reactor. The apparatus may furthermore comprise a power line connecting the power generator to the reactor.

In another aspect, provided is a process for continuously upgrading heavy oil to produce upgraded oil, using a pulsed plasma reactor. The process may comprise forcing heavy oil through a heavy oil feed under a first pressure between 0.1 and 10 barg, or alternatively between 0.9 and 2 barg, to an inter-electrode gap inside of the reactor. The heavy oil feed may first pass the heavy oil through a heat exchanger to adjust the temperature of the heavy oil and arrive at a first trim exchanger wherethrough the heavy oil passes to arrive at the reactor. The inter-electrode gap may be defined by a distance between a first end of a negative electrode and a first end of a positive electrode. A second end of the positive electrode and a second end of the negative electrode may be connected to a power generator by a power line. The process may also comprise forcing, at a second pressure between 0.2 and 20 barg, or alternatively between 1 and 3 barg, a light hydrocarbon gas through a light hydrocarbon gas feed and into the reactor to mix with the heavy oil therein, to form a liquid hydrocarbon-gas mixture in between the inter-electrode gap. The process may moreover comprise generating a spark-discharge in the inter-electrode gap to react the liquid hydrocarbon-gas mixture. The process may additionally comprise flowing reacted liquid hydrocarbon-gas mixture into a separator and separating light hydrocarbon liquid and light hydrocarbon gas from heavy oil. The process may further comprise flowing the separated light hydrocarbon gas from the separator to a compressor and compressing the light hydrocarbon gas. Fresh hydrogen and fresh hydrocarbon gas may be added to the light hydrocarbon gas to produce a hydrogen-light hydrocarbon gas mixture and recycle the hydrogen-light hydrocarbon gas mixture to the reactor. The process may furthermore comprise flowing heavy oil from the separator to the heat exchanger. The heavy oil from the separator may combine with heavy oil from the heavy oil feed to produce combined heavy oil. The process may also comprise removing the combined heavy oil or blending the combined heavy oil with the light hydrocarbon liquid to produce upgraded oil.

In one or more implementations, 1% to 50% of the volume of the heavy oil may be converted to light hydrocarbon liquid and/or light hydrocarbon gas, with a preferred range of between 3% and 30%.

In one or more implementations, the heavy oil from the separator and heavy oil from the heavy oil feed may be combined at a ratio of 1:10 to 20:1, with a preferred ratio of between 1:1 and 10:1.

In one or more implementations, the combined heavy oil from the separator and heavy oil from the heavy oil feed may be adjusted to a temperature of 25° C. to 200° C. and a viscosity of between 1 and 1,000 cP upon entry to the reactor, with a preferred viscosity of between 10 and 200 cP.

In one or more implementations, the reactor may comprise multiple inter-electrode gaps. The preferred number of gaps may scale linearly with the desired throughput of the process application. The ancillary equipment associated with the reactions may be sized accordingly and larger applications may provide economies of scale for this equipment.

In one or more implementations, the separator may comprise a fractional distillation apparatus or an absorber, which may be a pressure swing absorber.

In one or more implementations, the light hydrocarbon liquid may have an upper boiling point between 100° C. and 300° C.

In one or more implementations, a portion of the light hydrocarbon liquid may be removed before blending the light hydrocarbon liquid with the combined heavy oil.

In one or more implementations, fresh hydrogen and/or fresh hydrocarbon gas may be added to the separated light hydrocarbon gas before and/or after it is compressed.

In one or more implementations, the light hydrocarbon gas composition may be analyzed before flowing it to the reactor.

In one or more implementations, the compressed light hydrocarbon gas may be purged. The purged light hydrocarbon gas may provide power to the reactor and/or may provide heat used in the process. Hydrogen may be recovered from the purged light hydrocarbon gas.

In one or more implementations, a microturbine may provide energy for the spark-discharge. The amount of fresh hydrogen added to the light hydrocarbon gas may be an amount sufficient to provide a hydrogen-light hydrocarbon gas mixture comprising a hydrogen concentration between 1% and 65% by volume, with a preferred concentration of between 10 and 50% hydrogen. The hydrogen-light hydrocarbon gas mixture may be provided to the reactor at a flow rate between 0.01 to 1 L/min.

In one or more implementations, the upgraded oil may have an improved boiling curve as indicated by the conversion. Conversion may be defined as the amount of new material boiling below 400 degrees C. that is created during the reactions divided by the total initial mass. In some embodiments, conversion may be defined by new material created that boils below 300 degrees C., or some other temperature. The upgraded oil may also have an improved API gravity of between 0.1 and 20. The upgraded oil may have an improved asphaltene content of between 0 and 10%. Preferred ranges of the conversion, API improvement, and asphaltene reduction may depend on the specific application and relative values of the feed and products.

In one or more implementations, the heat exchanger is bypassed by the heavy oil. In one or more implementations, the first trim exchanger and/or the second trim exchanger may be bypassed by the heavy oil.

In one or more implementations, the heavy oil being forced through the heavy oil feed may be cooled by the heat exchanger and/or the first trim exchanger.

In one or more implementations, the heavy oil feed comprises heavy oil that does not require upgrading. The heavy oil feed may bypass the reactor to arrive at the separator after passing through the heat exchanger and first trim exchanger. The process may comprise separating light hydrocarbon liquid and light hydrocarbon gas from heavy oil. The separated heavy oil may be conveyed to the reactor.

In another aspect, provided is a process for continuously upgrading heavy oil to produce upgraded oil, using a pulsed plasma reactor. The process may comprise forcing heavy oil through a heavy oil feed with a first pressure between 0.1 and 10 barg, or alternatively with a range of 0.9 to 2 barg, through a heat exchanger and a first trim exchanger and into a separator and separating light hydrocarbon liquid and light hydrocarbon gas from the heavy oil. Separated heavy oil may be flowed to the heat exchanger to combine with heavy oil from the heavy oil feed and/or the separated heavy oil may be flowed to an inter-electrode gap comprised in the reactor. The inter-electrode gap may be defined by a distance between a first end of a negative electrode and a first end of a positive electrode. A second end of the positive electrode and a second end of the negative electrode may be connected to a power generator by a power line. The light hydrocarbon gas may be flowed to a compressor and/or the power generator. The light hydrocarbon gas at the compressor may be compressed and/or flowed to the reactor. The light hydrocarbon liquid may be flowed to a blender and/or collected. The process may also comprise forcing, at a second pressure between 0.2 and 20 barg, or alternatively between 1 and 3 barg, a light hydrocarbon gas through a light hydrocarbon gas feed and into the reactor to mix with the heavy oil therein, to form a liquid hydrocarbon-gas mixture in between the inter-electrode gap. The process may moreover comprise generating a spark-discharge in the inter-electrode gap to react the liquid hydrocarbon-gas mixture. The process may additionally comprise flowing the reacted liquid hydrocarbon-gas mixture to the separator and separating light hydrocarbon liquid and light hydrocarbon gas from the heavy oil. The process may further comprise combining separated heavy oil and heavy oil from the heavy oil feed and flowing the combined heavy oil through a second trim exchanger and to the blender and blending the combined heavy oil with the light hydrocarbon liquid to produce upgraded oil.

In one or more implementations, 1% to 50% of the volume of the heavy oil may be converted to light hydrocarbon liquid and/or light hydrocarbon gas, with a preferred range of between 3 and 30%.

In one or more implementations, the heavy oil from the separator and heavy oil from the heavy oil feed may be combined at a ratio of 1:10 to 20:1, with a preferred range of between 1:1 and 1:10. The combined heavy oil may be adjusted to a temperature of 25° C. to 200° C. and may have a viscosity of between 1 and 1,000 cP after combination, with a preferred range of between 10 and 200 cP.

In one or more implementations, the reactor may comprise multiple inter-electrode gaps. The preferred number of gaps may scale linearly with the desired throughput of the process application. The ancillary equipment associated with the reactions may be sized accordingly and larger applications may provide economies of scale for this equipment.

In one or more implementations, the separator may comprise a fractional distillation apparatus and/or an absorber. The absorber may be a pressure swing absorber.

In one or more implementations, the light hydrocarbon liquid may have an upper boiling point between 100° C. and 300° C.

In one or more implementations, a portion of the light hydrocarbon liquid may be removed before blending it with the combined heavy oil.

In one or more implementations, fresh hydrogen and/or fresh hydrocarbon gas may be added to the separated light hydrocarbon gas before and/or after it is compressed.

In one or more implementations, the light hydrocarbon gas composition may be analyzed before flowing it to the reactor.

In one or more implementations, the compressed light hydrocarbon gas may be purged. The purged light hydrocarbon gas may provide power to the reactor and/or provide heat used in the process. Hydrogen may be recovered from the purged light hydrocarbon gas.

In one or more implementations, a microturbine may provide energy for the spark-discharge. The amount of fresh hydrogen added to the light hydrocarbon gas may be an amount sufficient to provide a hydrogen-light hydrocarbon gas mixture comprising a hydrogen concentration between 1% and 65% by volume, with a preferred concentration of between 10 and 50% hydrogen. The hydrogen-light hydrocarbon gas mixture may be provided to the reactor at a flow rate between 0.01 to 1 L/min.

In one or more implementations, the upgraded oil may have an improved boiling curve as indicated by the conversion. Conversion may be defined as the amount of new material boiling below 400 degrees C. that is created during the reactions divided by the total initial mass. In some embodiments, conversion may be defined by new material created that boils below 300 degrees C., or some other temperature. The upgraded oil may also have an improved API gravity of between 0.1 and 20. The upgraded oil may have an improved asphaltene content of between 0 and 10%. The preferred ranges of the conversion, API improvement, and asphaltene reduction may depend on the specific application and relative values of the feed and products.

In one or more implementations, the heat exchanger may be bypassed by the heavy oil from the heavy oil feed and/or the heavy oil from the separator.

In one or more implementations, the first trim exchanger and/or the second trim exchanger may be bypassed by the heavy oil.

In one or more implementations, the heavy oil being forced through the heavy oil feed may be cooled by the heat exchanger and/or the first trim exchanger.

DETAILED DESCRIPTION

The present technology relates to the field of processing liquids containing heavy hydrocarbon molecules into the lighter liquid and/or gaseous fractions. The present technology can be utilized for the cracking of liquid heavy oils to lighter hydrocarbon fractions by using a stream of carrier gas injected into the liquid heavy oil to form a mixture, followed by ionization of the mixture by electric discharge. This technology can be effectively applied to achieve efficient continuous heavy oil conversion into more commercially valuable upgraded oil.

The heavy oil upgrading process and apparatus described herein incorporate cracking liquid hydrocarbon materials into light hydrocarbon fractions by using a spark discharge. The process includes flowing a liquid hydrocarbon material through a discharge chamber and into an inter-electrode gap within the discharge chamber, where the inter-electrode gap is formed between a pair of electrodes spaced apart from one another. The process further includes injecting a carrier gas into the liquid hydrocarbon material as it enters the inter-electrode gap, thereby forming a gas-liquid hydrocarbon mixture. The pair of electrodes includes a positive electrode and a negative electrode, the negative electrode being connected to a capacitor. The capacitor is charged to a voltage equal to, or greater than the breakdown voltage of the carrier gas in the inter-electrode gap. As the gas-liquid hydrocarbon mixture is formed, it is subjected to a current between the electrodes at a voltage sufficient to effect a spark discharge. The process also includes recovering the light hydrocarbon gases and liquids resulting from the impact of the pulsed spark discharge on the gas-liquid hydrocarbon mixture.

The term "heavy oil" as used herein refers to those hydrocarbon compounds, and mixtures thereof, which are in the liquid state at atmospheric conditions. The heavy oils may optionally have solids suspended therein. The heavy oils may contain other conventional additives, including, but not limited to flow improvers, anti-static agents, anti-oxidants, wax anti-settling agents, corrosion inhibitors, ashless detergents, anti-knock agents, ignition improvers, dehazers, re-odorants, pipeline drag reducers, lubricity agents, cetane improvers, spark-aiders, valve-seat protection compounds, synthetic or mineral oil carrier fluids and anti-foaming agents. Illustrative heavy oils include, but are not limited to, mineral oil; petroleum products including, but not limited to, crude oil, gasoline, kerosene and fuel oil; straight and branched chain paraffin hydrocarbons; cyclo-paraffin hydrocarbons; mono-olefin hydrocarbons; diolefin hydrocarbons; alkene hydrocarbons; and aromatic hydrocarbons including, but not limited to, benzene, toluene and xylene.

As used herein "bypass" refers to a total or partial bypass of a liquid stream through that which it bypasses. A heavy oil line or feed may bypass a heat exchanger or trim exchanger by not passing heavy oil through it whatsoever or diverting a certain percentage of the stream from passing through the trim exchanger or heat exchanger.

"Heat exchanger" as used herein refers to a device used to transfer heat between a solid object and a fluid, or between two or more fluids. The fluids may be separated by a solid wall to prevent mixing or they may be in direct contact.

"Trim exchanger" as used herein refers to a heat exchanger using external utilities, such as cooling water, air, steam, thermal oil, or some other cooling or heating medium to allow more precise control of fluid process temperature.

"Separator" as used herein refers to a housing containing means for separating components of a mixture or purifying them. Such means include stills, chromatography columns, absorbers, crystallization setups, sublimators, filters, centrifuges, liquid-liquid extractors, and activated carbon.

"Blender" as used herein refers to a containing for stirring, mixing, emulsifying, or homogenizing multi component liquids.

Where the heavy oil includes crude oil, the crude oil may contain hydrocarbons of a wide range of molecular weights and forms. For examples, the hydrocarbons may include, but are not limited to, paraffins, aromatics, naphthenes, cycloalkanes, alkenes, dienes, and alkynes. The hydrocarbons may be characterized by the total number of carbon atoms (C) and/or the amount of single (C—C), double (C=C) or triple (C≡C) bonds between carbon atoms. Due to the varied compounds present in crude oil, it is a feedstock that is well-suited to the described process. It may be used for readily generating light hydrocarbons, including, but not limited to, gasoline and kerosene, or heavier hydrocarbons including, but not limited to, diesel oil and fuel oil. The hundreds of different hydrocarbon molecules in crude oil are converted, using the processes of the present technology, into components which can be used as fuels, lubricants, and as feedstocks in other petrochemical processes.

As used herein, "light hydrocarbon gas" or "produced light liquids" refers to hydrocarbons created from the cracking of higher carbon containing hydrocarbons into compounds of lower carbon content. Light hydrocarbon gas may include $C_1$-$C_5$ alkanes. Light hydrocarbon gas may also be introduced into the process or apparatus from a fresh source external to the apparatus or process described herein.

"Line" as used herein may refer to tubing, a pipeline, or vector for conveyance of liquid. "Power line" as used herein conveys energy.

"Compressor" as used herein refers to a mechanical device that increases the pressure of a gas by reducing its volume. Non-limiting examples include reciprocating compressors, ionic liquid piston compressors, rotary screw compressors, rotary vane compressors, rolling pistons, scroll compressors, diaphragm compressors, dynamic compressors, air bubble compressors, centrifugal compressors, mixed flow or diagonal compressors, gas jet compressors, or axial flow compressors.

"Power generator" or "power source" as used herein, refers to standard power generation processes, including fired heaters, gas turbines, fuel cells, or methods to convert the chemical energy in the hydrocarbon gas to electrical or heat energy.

Without being bound by theory, in any of the above processes or embodiments, heavy oils with a high carbon content are cleaved into molecules having a lower carbon content, to form hydrocarbon fractions that are lighter (in terms of both molecular weight and boiling point) on average than the heavier oils in the feedstock. Again, without being bound by theory, it is believed that the splitting of the heavy molecules occurs via the severing of C—C bonds. For these molecules, the energy required to break a C—C bond is approximately 261.9 kJ/mol. This energy amount is significantly less than the energy required to break a C—H bond (364.5 kJ/mol).

The present application provides a processes and apparatuses to streamline the transportation and processing of heavy oil simultaneously to produce high value, upgraded oil and hydrocarbon products while continuously recycling products derived from the heavy oil processing. The process uses a spark-discharge between electrodes to crack hydrocarbons in heavy oil. Cracked hydrocarbons are mixed with cracking products to produce upgraded oil with desirable viscosity. Before cracking, the heavy oil may be mixed with light hydrocarbon liquids and/or light hydrocarbon gases, which are derived from heavy oil being continuously cracked and products recycled. The light hydrocarbon liquids and gases are also collected as high value products. Light hydrocarbon gases may be recycled from the cracking process or introduced fresh, to mix with the heavy oil and form liquid-hydrocarbon gas mixtures which are reacted via spark-discharge.

Light hydrocarbon gases used in the spark discharge cracking process contain hydrogen atoms. Upon subjection of the heavy oil to spark discharge, free radicals are created. The free radicals of hydrocarbons attract hydrogen atoms. The carrier gas or light hydrocarbon gas as used herein and may thus be provided in the process to serve as a hydrogen atom source. Light hydrocarbon gas is separated from heavy oil in the process or apparatus or provided fresh to the process or apparatus from an external source. Suitable carrier gases, may include, but are not limited to, hydrogen atom-containing gases. Illustrative carrier gases may include, but are not limited to, hydrogen, methane, natural gas, and other gaseous hydrocarbons. In any of the above embodiments, a mixture of such illustrative carrier gases may be employed.

As the process is to be run continuously, the various stages or steps of the process may occur simultaneously or sequentially, such that the heavy oil is continuously fed to the discharge chamber or reactor as the product hydrocarbon fractions are exited from the chamber.

As set forth above, the process includes generating a spark discharge plasma into a jet of gas in the inter-electrode gap. The breakdown voltage of the carrier gas will be less than the breakdown voltage of the liquid, accordingly, the use of a jet of gas can be used at the same voltage level to generate a longer inter-electrode gap. Increasing the inter-electrode gap, while reducing the corrosion effects of the process on the electrodes, increases the area of direct contact between the plasma discharge and treated heavy oil. Without wishing to be bound by any particular theory, it is believed that upon contact of the discharge plasma with the heavy oil in the inter-electrode gap, the heavy oil rapidly heats and evaporates to form a vapor. Thus, molecules of the heavy oil are mixed with the carrier gas molecules and particles of the plasma formed therein. The plasma electrons collide with the hydrocarbon molecules, thereby breaking them down into smaller molecules having one unsaturated bond, and being essentially free radicals, i.e. fragments of molecules having a free bond. Free radicals also arise as a result of the direct interaction of fast moving electrons with the liquid walls formed around the plasma channel set up between the electrodes.

As noted above, various carrier gases known in the art can be used in the processes and apparatuses of the present technology. Exemplary carrier gases include, but are not limited to, helium, neon, argon, xenon, methane, $C_1$-$C_5$ hydrocarbons and hydrogen ($H_2$), among other gases. In some embodiments, the carrier gas is a hydrogen-containing gas, including, but not limited to, but not limited to, water, steam, pure hydrogen, methane, natural gas or other gaseous hydrocarbons. Mixtures of any two or more such hydrogen-containing gases may be used in any of the described embodiment. Further, non-hydrogen containing gases, including, but not limited to, helium, neon, argon, and xenon may be used either as diluent gases for any of the hydrogen-containing gases, or they may be used with the heavy oils, thus allowing the free radicals to terminate with one another instead of with a hydrogen atom from the carrier gas. From the standpoint of energy costs for the formation of one free hydrogen atom, in order to select a suitable carrier gas, it is advantageous to compare the dissociation energy of various carrier or hydrogen-containing gases. Thus, for example, to break the bond between the hydrogen atoms in a molecule of $H_2$ would require about 432 kJ/mol. For water vapor, the energy required to liberate a hydrogen atom is about 495 kJ/mol, whereas for removal of a hydrogen atom from a hydrocarbon molecule including, but not limited to, methane, about 364.5 kJ/mol is required.

According to some embodiments, carrier gas is methane. The use of methane, or natural gas, is beneficial not only in terms of the energy required to break bonds, but also due to its relatively low cost. By using methane, it is ensured that C—H bonds are broken to generate a hydrogen radical and a methyl radical, either of which may combine with larger hydrocarbon radicals in a termination step. In some embodiments, the carrier gas is methane or a mixture of methane with an inert gas including, but not limited to, helium, argon, neon, or xenon. In some embodiments the carrier gas is a mixture of methane, hydrogen (fresh and/or produced from the process or apparatus) and optionally the light hydrocarbon gas produced in the disclosed process or apparatus.

Various types of electric discharges can be used to produce plasma in the gas jet. These discharges can be either in a continuous mode, or in a pulsed mode. For example, in some embodiments, use of continuous discharges, including, but not limited to, an arc discharge or a glow discharge, is effective. However, use of this type of discharge for cracking heavy hydrocarbons may be limited by the fact that heating of the gaseous medium by continuous current may lead to undesirable increases in the temperature inside the discharge chamber. Such increases in temperature may lead to increased coking and soot production. Further, where a continuous discharge is used, the hydrocarbon fraction products are continually exposed to the discharge until they pass out of the plasma. In contrast, the use of a pulsed discharge, particularly pulsed spark discharge, may be desirable for the purpose of light hydrocarbon fraction production from heavy oil fractions, because the interval between pulses allows for termination of the free radicals and allows time for the product light hydrocarbons to exit the plasma.

In another aspect, an apparatus is provided for the conversion of a liquid hydrocarbon medium to a hydrocarbon fraction product. The apparatus may include a discharge chamber included in a reactor for housing the elements to provide a spark discharge for causing the conversion. The discharge chamber, and hence the apparatus, includes an inlet configured to convey the heavy oil to the discharge chamber, an outlet configured to convey a hydrocarbon fraction product from the discharge chamber, a negative electrode having a first end and a second end, and a positive electrode having a first end and a second end. In the discharge chamber, the first end of the negative electrode is spaced apart from the first end of the positive electrode by a distance, the distance defining an inter-electrode gap. To provide for a manner of mixing of the heavy oil with a carrier gas, as described above, the discharge chamber may also include a gas jet configured to introduce the carrier gas proximally to the inter-electrode gap. The carrier gas is injected into the heavy oil at, or just prior to, injection into the inter-electrode gap. The second end of the negative electrode and the second end of the positive electrode are connected to a which may include capacitor, and a power generator is provided and configured to generate the spark discharge in the inter-electrode gap.

In the reactor, a spark discharge is formed in the inter-electrode gap when the voltage (V) applied to the electrodes is equal to, or greater than, the breakdown voltage ($V_b$) of the inter-electrode gap. The spark discharge is initiated by free electrons, which usually appear on the positive electrode by field emission or by other processes of electron emission. The free electrons are accelerated into the electric field spanning the gap, and a spark plasma channel is generated as the gas in the gap is ionized. After forming a spark discharge channel, a current of discharge flows through the plasma. The voltage within the plasma channel ($V_d$) is lower than the breakdown voltage ($V_b$). An arc discharge is generated if the power generator is sufficient for the current in the discharge channel to flow in a continuous mode. The heating of the plasma also occurs in the spark discharge. However, the temperature can be controlled not only by adjusting the intensity of the discharge current, but also by controlling the duration of the discharge. In certain embodiments, as a result of the plasma channel created in the gas, the gas temperature can reach several thousand ° C.

Alternatively, a different power scheme may be used to generate the spark discharge. In some embodiments, a large variety of different pulse generators are used to ignite the spark discharges. For example, a circuit discharging a pre-charge storage capacitor on load may be used. The parameters of the pulse voltage at the load are determined by the storage capacity as well as the parameters of the whole of the discharge circuit. The energy losses will depend on the characteristics of the discharge circuit, in particular loss into the switch.

In some embodiments, a spark switch is directly used as the load, i.e., plasma reactor, thereby reducing energy losses in the discharge circuit. Further, the storage capacitor can be connected in parallel to the spark gap on the circuit with minimum inductance. The breakdown of the gap occurs when the voltage on storage capacitor reaches the breakdown voltage, and the energy input into the plasma spark occurs during the discharge of the capacitor. Consequently, energy losses in the circuit are low.

According to any of the above embodiments, the positive electrode may be shaped as a flat electrode, either as a sheet, a blade, or a flat terminal, while the negative electrode is tube-shaped, i.e. cannulated. A negative, cannulated electrode, is a hollow electrode through which the carrier gas may be injected into the heavy oil at the inter-electrode gap. Thus, the negative, cannulated electrode may serve as the conduit for the carrier gas. Where the negative electrode is cannulated, the passage of the cannula will have a radius of curvature at the opening of the tube. The height or length of discharge electrode is usually measured from the base that is the point of attachment, to the top. In some embodiments, the ratio of the radius of curvature to the height or length of the cathode can be greater than about 10.

As noted above, the inter-electrode gap, i.e. the distance between the two electrodes, influences the efficiency of the process. The inter-electrode gap is a feature that is amenable to optimization based upon, for example, the particular hydrocarbon material fed to the discharge chamber, the injected carrier gas, and the applied voltage and/or current. However, some ranges for the inter-electrode gap may be set forth. For example, in any of the above embodiments, the inter-electrode gap may be from about 1-3 to about 100 millimeters. This may include an inter-electrode gap from about 3 to about 20 millimeters, by using the operating voltage of 30-50 kV the optimum gap length will be 8 to 12 millimeters. The negative electrode and the positive electrode may both project into the discharge chamber.

As noted, the storage capacitor may be charged to a voltage equal to, or greater than, the breakdown voltage of the carrier gas, such that a spark discharge is produced. In some embodiments, the discharge occurs between the positive electrode and the carrier gas proximal to the first end of the positive electrode. In some embodiments, the discharge is continuous. In other embodiments, the discharge is pulsed. In some embodiments, the rate of electric discharge is regulated by the value of resistance in the charging circuit of the storage capacitor.

A power generator is connected to the entire system to provide the energy input necessary to drive the discharge. In some embodiments, a DC power generator with an operating voltage of 15-25 kV can be used in the device described herein. The power generator depends on the number of gaps for processing of hydrocarbon liquid, on their length, pulse repetition rate, liquid flow rate through the reactor, the gas flow rate through each gap. An example of a device that uses 12 gaps is described herein. For example, the device may include a reactor which utilizes inter-electrode gaps of 3.5 mm length, capacitors by 100 pF capacity, operating voltage 18 kV and a pulse repetition rate of 5 Hz. The power generator consumed can range from 1 to 2 watts, while the plasma can absorb a power of about 0.97 watts directly in the discharge. The remaining energy may be dissipated in the charging system capacitors.

Other components may also be included in the apparatus. For example, a reservoir or pipeline system may connect a heavy oil feed to a heavy oil source, and a reservoir or pipeline system may be connected to outlets for collection of the upgraded oil, light hydrocarbon gas or light hydrocarbon liquid products. The products may be subjected to further processing by distillation separation of the lower molecular weight components, with higher molecular weight components being returned to the reactor for possible further processing. A gas capture system may be connected to the outlet on the apparatus, allowing for capture of low molecular weight hydrocarbon gases, liquid hydrocarbon gas and/or carrier gases, the latter one being recycled for re-injection as the carrier gas, and the former two being collected for other use.

The apparatus may be adapted to any particular mode of treatment of the heavy oils. Such adaptive flexibility provides ready control over the processing of crude oil, which may vary across a wide range of compositions and impurities. Control of the process conditions for cracking of the heavy oils is possible by changing only a few operating parameters. For example, such parameters may include changes to the inter-electrode gap length, and/or the applied voltage (V). Increases in the voltage may result in square proportional degree increasing of energy $W=CV^2/2$, stored on a capacitor. Changing the value of the capacitor is linearly proportional to the changing the energy input to the discharge W. Control of the pulse repetition rate may be achieved through manipulation of the capacitance and resistance of the circuit. In some embodiments, the pulse repetition rate is from about 1 to about 1000 pulses per second. In other embodiments, the pulse repetition rate is from about 2 to about 7 pulses per second. In any of the above embodiments, the pulse repetition rate is from about 3 to about 5 pulses per second.

Changes in the electrical characteristics of the supply circuit is not the only reason for the change in the cracking process using the apparatus. Regulation of the spark discharge may be carried out by changing the flowing velocity of the carrier gas and the heavy oils, as well as the controlling the processing time of liquid hydrocarbons and hydrocarbon fraction products within the chamber. Other conditions remaining the same, the carrier gas flow rate into the heavy oil has a significant impact on the upgraded oil, light hydrocarbon liquid and light hydrocarbon gas products. Carrier gas streams or jets of varying diameters can be formed in the inter-electrode space depending on the gas flow rate and viscosity of the fluid. The spark discharge plasma is not in direct contact with the liquid, by the large diameter gas jet, if it is formed at a high gas flow rate. In case of a low gas flow rate, the gas jet diameter is comparable to the diameter of the channel spark. In such cases, there is an intensive interaction between the discharge plasma and the surrounding liquid. The intensive interaction indicates that the area of contact between plasma channel and liquid is maximized.

Figure 1:
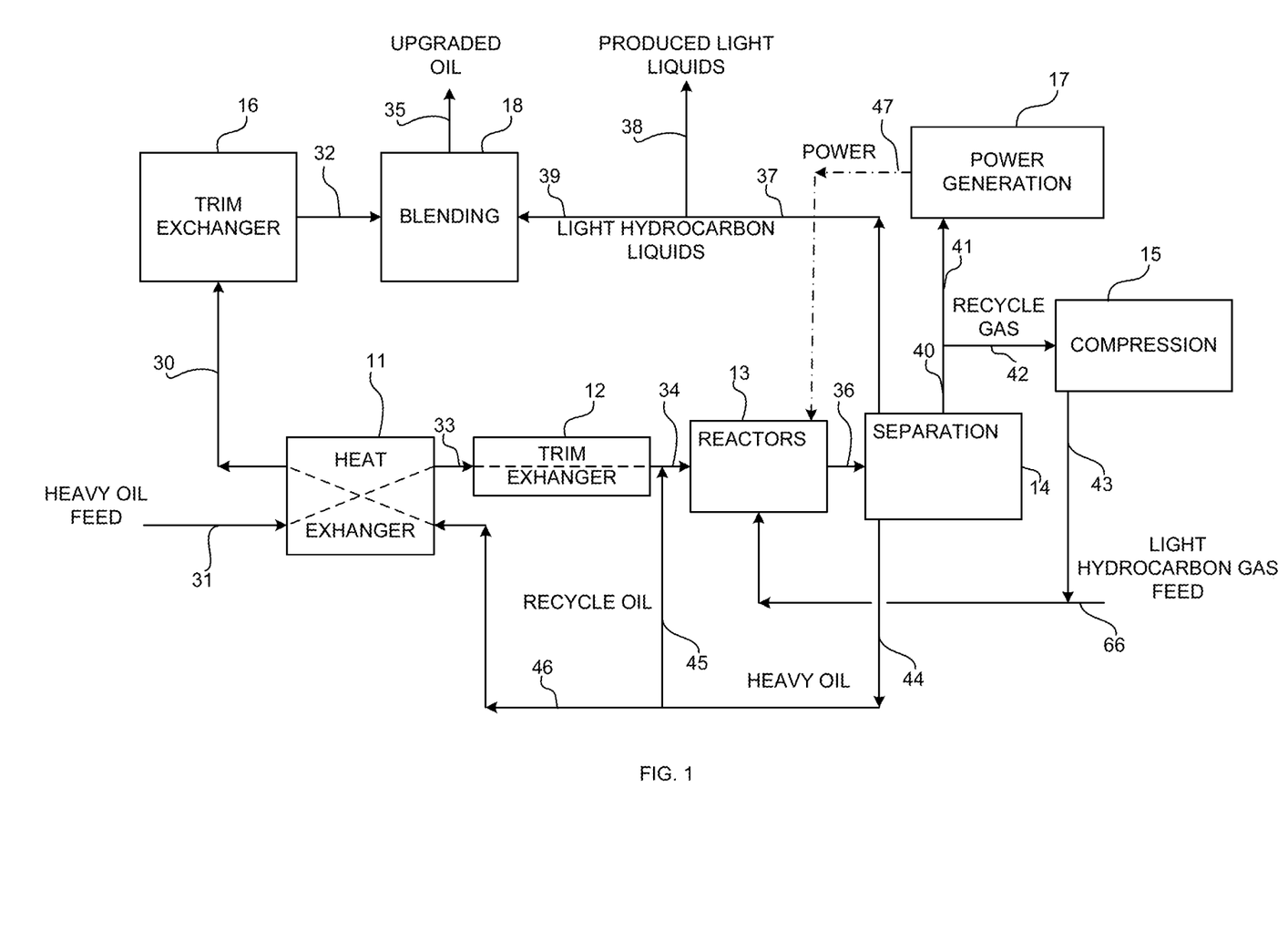
FIG. 1 illustrates an apparatus for the continuous upgrading of heavy oil where the heavy oil is first cracked, then products (light hydrocarbon gas and light hydrocarbon liquid) are separated from the remaining heavy oil and the products and remaining heavy oil are subsequently collected or recycled into the apparatus for use in further upgrading of heavy oil.

In one aspect, referring to FIG. 1, provided is an apparatus for continuously upgrading the quality of heavy oil, the apparatus including a heavy oil feed (31) connected to a heat exchanger (11) for conveying heavy oil through the heat exchanger (11), wherein the heavy oil feed (31) is continuous with a line (33) connecting the heat exchanger (11) with a first trim exchanger (12). The apparatus includes a reactor (13) with a line (34) configured to deliver heavy oil thereto, wherein the line (34) runs through first trim exchanger (12) and is continuous with line (33). The apparatus includes a separator (14) connected to the reactor (13) by a line (36), wherein the separator (14) is connected to a line (44) that splits into a recycling line (45) and a line (46), wherein the recycling line (45) merges with line (34) and the line (46) connects to the heat exchanger (11), and wherein a line (37) is connected to the separator and splits into a produced light liquids line (38) and a second line (39), wherein the second line (39) connects to a blender (18). The apparatus includes a second trim exchanger (16), connected to heat exchanger (11) by a line (30), wherein the line (30) is continuous with the line (46). The apparatus includes a line (32) connecting the blender (18) and the second trim exchanger (16). The apparatus includes an upgraded oil line (35) connected to the blender (18). The apparatus includes a compressor (15), wherein a line (40) is connected to the separator (14) and splits into a recycle gas line (42) and a third line (41), wherein the recycle gas line (42) connects to the compressor (15) and the third line (41) connects to a power generator (17). The apparatus includes a light hydrocarbon gas feed (66) for conveying fresh light hydrocarbon gas to the reactor (13). The apparatus includes a line (43) connecting the compressor (15) to the light hydrocarbon gas feed (66). The apparatus includes a power line (47) connecting power generator (17) to the reactor (13).

Figure 2:
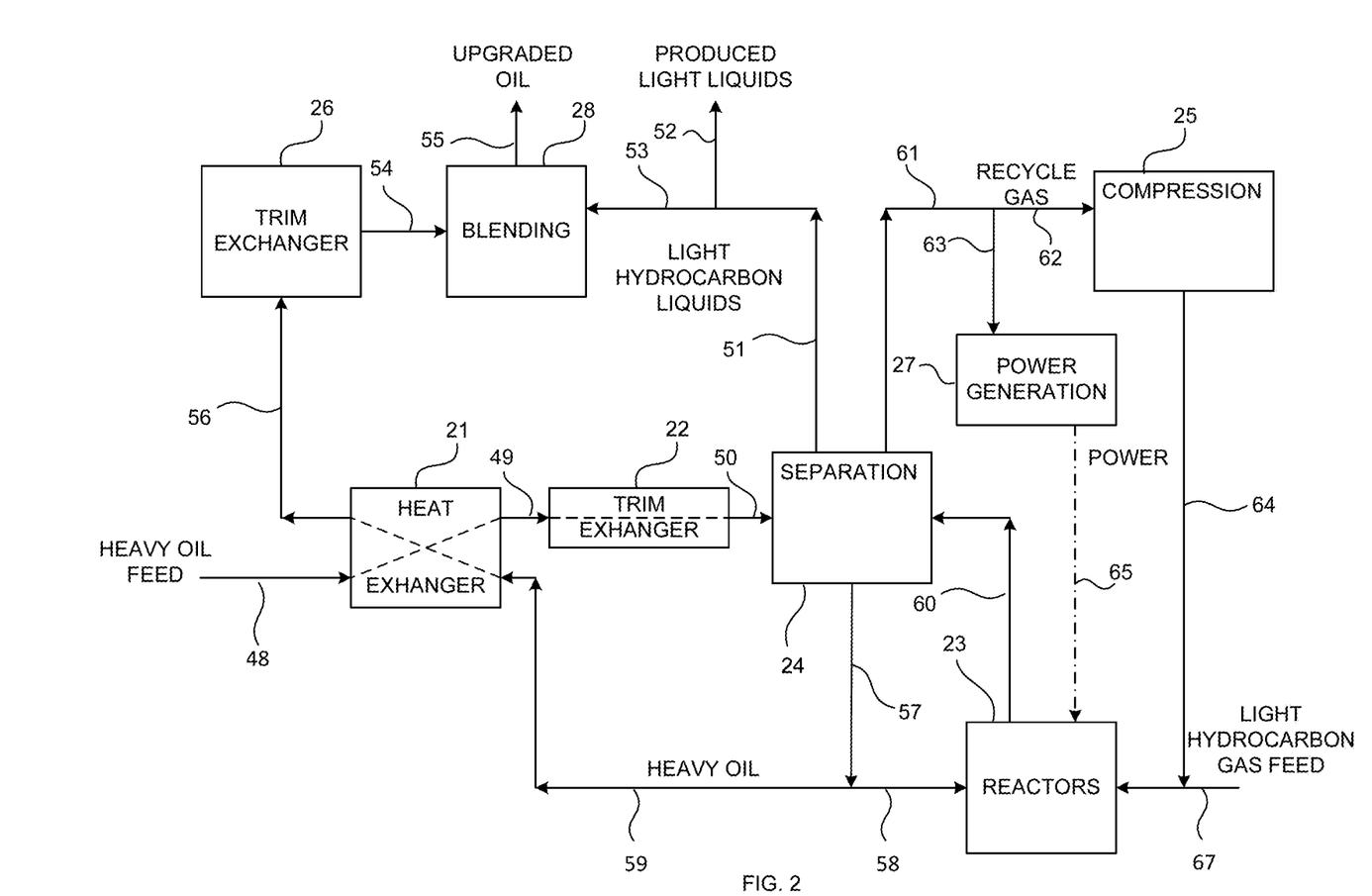
FIG. 2 illustrates an apparatus for the continuous upgrading of heavy oil where the heavy oil is first separated into light hydrocarbon gas, light hydrocarbon liquid and heavy oil. The heavy oil is then subjected to cracking in a reactor and then the components are again separated. Light hydrocarbon gas and light hydrocarbon liquid are collected after separations or further recycled into the apparatus for use in further upgrading of heavy oil.

In another aspect, referring to FIG. 2, provided is an apparatus for continuously upgrading heavy oil to produce upgraded oil, the apparatus including a heavy oil feed (48) connected to a heat exchanger (21) for conveying heavy oil through the heat exchanger (21), wherein the heavy oil feed (48) is continuous with a line (49) connecting the heat exchanger (21) with a first trim exchanger (22). The apparatus includes a separator (24) connected to the first trim exchanger (22) by a line (50), wherein the line (50) is continuous with the line (49). The apparatus includes a line (57) connected to the separator (24), wherein the line (57) branches into a heavy oil line (59) and a line (58), wherein the heavy oil line (59) runs through the heat exchanger (21) and is continuous with line (56) connected to a second trim exchanger (26), and wherein the line (58) connects to a reactor (23), wherein a line (60) connects the reactor (23) with the separator (24). The apparatus includes a blender (28) connected to the second trim exchanger (26) by a line (54), wherein an upgraded oil line (55) is connected to the blender (28), a line (51) connected to the separator (24) wherein the line (51) branches into a light hydrocarbon liquid line (53) and a produced light liquid line (52), wherein the light hydrocarbon liquid line (53) connects to the blender (28). The apparatus includes a line (61) connected to the separator (24), wherein the line (61) branches into a line (63) and a recycle gas line (62), wherein the line (63) is connected to a power generator (27), and wherein the recycle gas line (62) is connected to a compressor (25), wherein the compressor (25) is connected to a line (64), wherein the line (64) merges with a light hydrocarbon gas feed (67), wherein the light hydrocarbon gas feed is configured to convey fresh light hydrocarbon gas to the reactor (23). The apparatus includes a power line (65) connecting the power generator (27) to the reactor (23).

In another aspect, referring to FIG. 1, provided is a process for continuously upgrading heavy oil to produce upgraded oil, using a pulsed plasma reactor (13), the process including: forcing heavy oil through a heavy oil feed (31) under a first pressure between 0.1 and 10 barg (preferred range of 0.9 to 2 barg) to an inter-electrode gap inside of reactor (13), wherein the heavy oil feed (31) first passes the heavy oil through a heat exchanger (11) to adjust the temperature of the heavy oil and arrive at a first trim exchanger (12) wherethrough the heavy oil passes to arrive at the reactor (13), and wherein the inter-electrode gap is defined by a distance between a first end of a negative electrode and a first end of a positive electrode, wherein a second end of the positive electrode and a second end of the negative electrode are connected to a power generator (17) by a power line (47). The process further includes forcing, at a second pressure between 0.2 and 20 barg (preferred 1 to 3 barg) a light hydrocarbon gas through a light hydrocarbon gas feed (66) and into the reactor (13) to mix with the heavy oil therein, to form a liquid hydrocarbon-gas mixture in between the inter-electrode gap. The process further includes generating a spark-discharge in the inter-electrode gap to react the liquid hydrocarbon-gas mixture. The process further includes flowing reacted liquid hydrocarbon-gas mixture into a separator (14) and separating light hydrocarbon liquid and light hydrocarbon gas from heavy oil. The process further includes flowing the separated light hydrocarbon gas from the separator (14) to a compressor (15) and compressing the light hydrocarbon gas, wherein fresh hydrogen and/or fresh hydrocarbon gas is added to the light hydrocarbon gas to produce a hydrogen-light hydrocarbon gas mixture and recycling the hydrogen-light hydrocarbon gas mixture to the reactor (13). The process further includes flowing heavy oil from the separator (14) to the heat exchanger (11) wherein the heavy oil from the separator (14) combines with heavy oil from the heavy oil feed to produce combined heavy oil. The process further includes removing the combined heavy oil or blending the combined heavy oil with the light hydrocarbon liquid to produce upgraded oil.

In some embodiments 1% to 50% of the volume of the heavy oil is converted to light hydrocarbon liquid and/or light hydrocarbon gas. In some embodiments 1% to 10% of the volume of the heavy oil is converted to light hydrocarbon liquid and/or light hydrocarbon gas. In some embodiments 10% to 20% of the volume of the heavy oil is converted to light hydrocarbon liquid and/or light hydrocarbon gas. In some embodiments 20% to 30% of the volume of the heavy oil is converted to light hydrocarbon liquid and/or light hydrocarbon gas. In some embodiments 30% to 50% of the volume of the heavy oil is converted to light hydrocarbon liquid and/or light hydrocarbon gas. In some embodiments 50% to 75% of the volume of the heavy oil is converted to light hydrocarbon liquid and/or light hydrocarbon gas. In some embodiments 75% to 100% of the volume of the heavy oil is converted to light hydrocarbon liquid and/or light hydrocarbon gas. Depending upon the application, the preferred range may be as low as 3% to be economically advantageous, while other embodiments may require higher conversion per reaction pass to be viable. Each application will possess an optimal range of conversion, as increased product value from higher conversion will require additional energy. A preferred conversion for partial upgrading of heavy crude oil for pipeline transportation is between 3 and 10%, while a preferred conversion of a refinery heavy gas oil may be between 5 and 30%.

In some embodiments, the heavy oil from the separator (14) and heavy oil from the heavy oil feed are combined at a ratio of 1:10 to 20:1. In some embodiments, the heavy oil from the separator (14) and heavy oil from the heavy oil feed are combined at a ratio of 1:10 to 1:5. In some embodiments, the heavy oil from the separator (14) and heavy oil from the heavy oil feed are combined at a ratio of 1:5 to 1:2. In some embodiments, the heavy oil from the separator (14) and heavy oil from the heavy oil feed are combined at a ratio of 1:2 to 1:1. In some embodiments, the heavy oil from the separator (14) and heavy oil from the heavy oil feed are combined at a ratio of 1:1 to 2:1. In some embodiments, the heavy oil from the separator (14) and heavy oil from the heavy oil feed are combined at a ratio of 2:1 to 5:1. In some embodiments, the heavy oil from the separator (14) and heavy oil from the heavy oil feed are combined at a ratio of 5:1 to 10:1. A preferred feed/recycle oil ratio is between 1 and 10.

In some embodiments, the combined heavy oil from the separator (14) and heavy oil from the heavy oil feed are adjusted to a temperature of 25° C. to 200° C. In some embodiments, the combined heavy oil from the separator (14) and heavy oil from the heavy oil feed are adjusted to a temperature of 15° C. to 50° C. In some embodiments, the combined heavy oil from the separator (14) and heavy oil from the heavy oil feed are adjusted to a temperature of 50° C. to 100° C. In some embodiments, the combined heavy oil from the separator (14) and heavy oil from the heavy oil feed are adjusted to a temperature of 100° C. to 150° C. In some embodiments, the combined heavy oil from the separator (14) and heavy oil from the heavy oil feed are adjusted to a temperature of 150° C. to 200° C. with a preferred temperature of between 120 and 150° C.

In some embodiments, the combined heavy oil from the separator (14) and heavy oil from the heavy oil feed and has a viscosity of between 1 and 1,000 cP upon entry to the reactor (13). In some embodiments, the combined heavy oil from the separator (14) and heavy oil from the heavy oil feed and has a viscosity of between 1 and 50 cP upon entry to the reactor (13). In some embodiments, the combined heavy oil from the separator (14) and heavy oil from the heavy oil feed and has a viscosity of between 50 and 300 cP upon entry to the reactor (13). In some embodiments, the combined heavy oil from the separator (14) and heavy oil from the heavy oil feed and has a viscosity of between 300 and 600 cP upon entry to the reactor (13). In some embodiments, the combined heavy oil from the separator (14) and heavy oil from the heavy oil feed and has a viscosity of between 600 and 900 cP upon entry to the reactor (13). In some embodiments, the combined heavy oil from the separator (14) and heavy oil from the heavy oil feed and has a viscosity of between 900 and 1,250 cP upon entry to the reactor (13). In some embodiments, the combined heavy oil from the separator (14) and heavy oil from the heavy oil feed and has a viscosity of greater than 1,000 cP upon entry to the reactor (13). The preferred viscosity ranges between 10 and 200 cP.

In some embodiments, the reactor (13) comprises multiple inter-electrode gaps. In some embodiments, the reactor (13) comprises two inter-electrode gaps. In some embodiments, the reactor (13) comprises three inter-electrode gaps. In some embodiments, the reactor (13) comprises four inter-electrode gaps. In some embodiments, the reactor (13) comprises five inter-electrode gaps. In some embodiments, the reactor (13) comprises 5-10 inter-electrode gaps. In some embodiments, the reactor (13) comprises 20-50 inter-electrode gaps. In some embodiments, the reactor (13) comprises 50-100 inter-electrode gaps. In some embodiments, the reactor (13) comprises greater than 100 inter-electrode gaps. The preferred number of gaps will scale linearly with the desired throughput of the process application. The ancillary equipment associated with the reactions will be sized accordingly and larger applications will provide economies of scale for this equipment.

In some embodiments, the separator (14) comprises a fractional distillation apparatus or an absorber. In some embodiments, the absorber is a pressure swing absorber.

In some embodiments, the light hydrocarbon liquid has an upper boiling point between 100° C. and 300° C. In some embodiments, the light hydrocarbon liquid has an upper boiling point between 90° C. and 110° C. In some embodiments, the light hydrocarbon liquid has an upper boiling point between 110° C. and 130° C. In some embodiments, the light hydrocarbon liquid has an upper boiling point between 130° C. and 150° C. In some embodiments, the light hydrocarbon liquid has an upper boiling point between 150° C. and 170° C. In some embodiments, the light hydrocarbon liquid has an upper boiling point between 170° C. and 190° C. In some embodiments, the light hydrocarbon liquid has an upper boiling point between 190° C. and 210° C. In some embodiments, the light hydrocarbon liquid has an upper boiling point between 210° C. and 230° C. In some embodiments, the light hydrocarbon liquid has an upper boiling point between 230° C. and 250° C. In some embodiments, the light hydrocarbon liquid has an upper boiling point between 250° C. and 270° C. In some embodiments, the light hydrocarbon liquid has an upper boiling point between 270° C. and 290° C. In some embodiments, the light hydrocarbon liquid has an upper boiling point between 270° C. and 310° C. In some embodiments the light hydrocarbon liquid has an upper boiling point less than 90° C.

In some embodiments, the method further includes removing a portion of the light hydrocarbon liquid before blending it with the combined heavy oil. In some embodiments, fresh hydrogen and/or fresh hydrocarbon gas is added to the separated light hydrocarbon gas before and/or after it is compressed.

In some embodiments, the process comprises analyzing the light hydrocarbon gas composition before flowing it to the reactor (13). In some embodiments, the analysis is by colorimetric analysis. In some embodiments, the analysis is by gas chromatography (GC). In some embodiments, the analysis is by gas chromatography mass spectrometry (GCMS). In some embodiments, the analysis is by gas density, gas molecular weight, or other measurement techniques to determine gas composition, either directly or indirectly.

In some embodiments, the process further includes purging the compressed light hydrocarbon gas to control pressure. In some embodiments, the purged light hydrocarbon gas provides power to the reactor (13) and/or provides heat used in the process. In some embodiments, hydrogen is recovered from the purged light hydrocarbon gas. In some embodiments, a microturbine provides energy for the spark-discharge.

In some embodiments, the amount of fresh hydrogen added to the light hydrocarbon gas is an amount sufficient to provide a hydrogen-light hydrocarbon gas mixture comprising a hydrogen concentration between 1% and 50% by volume. In some embodiments, the hydrogen concentration between 1% and 10% by volume. In some embodiments, the hydrogen concentration between 10% and 20% by volume. In some embodiments, the hydrogen concentration between 20% and 30% by volume. In some embodiments, the hydrogen concentration between 30% and 40% by volume. In some embodiments, the hydrogen concentration between 40% and 50% by volume. In some embodiments, the hydrogen concentration between 50% and 60% by volume. In some embodiments, the hydrogen concentration between 60% and 80% by volume. In some embodiments, the hydrogen concentration is greater than 80% by volume.

In some embodiments the hydrogen-light hydrocarbon gas mixture is provided to the reactor at a flow rate between 0.01 to 1 L/min. In some embodiments the hydrogen-light hydrocarbon gas mixture is provided to the reactor at a flow rate between 0.01 to 0.2 L/min. In some embodiments the hydrogen-light hydrocarbon gas mixture is provided to the reactor at a flow rate between 0.2 to 0.4 L/min. In some embodiments the hydrogen-light hydrocarbon gas mixture is provided to the reactor at a flow rate between 0.4 to 0.6 L/min. In some embodiments the hydrogen-light hydrocarbon gas mixture is provided to the reactor at a flow rate between 0.6 to 0.8 L/min. In some embodiments the hydrogen-light hydrocarbon gas mixture is provided to the reactor at a flow rate between 0.8 to 1 L/min. In some embodiments the hydrogen-light hydrocarbon gas mixture is provided to the reactor at a flow rate greater than 1 L/min.

In some embodiments, the upgraded oil has an improved boiling curve as indicated by the conversion. Conversion is defined as the amount of new material boiling below 400 C that is created during the reactions divided by the total initial mass. In some embodiments, conversion may be defined by new material created that boils below 300 C, or some other temperature. The upgraded oil will also have an improved API gravity of between, 0.1 and 20. The upgraded oil will have an improved asphaltene content of between 0 and 10%. The preferred ranges of the conversion, API improvement, and asphaltene reduction will depend on the specific application and relative values of the feed and products.

In some embodiments, the heat exchanger (11) is bypassed by the heavy oil. In some embodiments, the first trim exchanger (12) and/or the second trim exchanger (16) is bypassed by the heavy oil. In some embodiments, the heavy oil being forced through the heavy oil feed (31) is cooled by the heat exchanger (11) and the first trim exchanger (12). In some embodiments the heat exchanger (11) cools heavy oil. In some embodiments, the heat exchanger (11) heats heavy oil. In some embodiments heat exchanger (11) may be bypassed by the line passing through it.

In some embodiments the first trim exchanger (12) heats heavy oil passing through it. In some embodiments the first trim exchanger (12) cools heavy oil passing through it. In some embodiments the second trim exchanger (16) heats heavy oil passing through it. In some embodiments the second trim exchanger (16) cools heavy oil passing through it.

In some embodiments, the heavy oil feed comprises heavy oil that does not require upgrading, and wherein the heavy oil feed bypasses the reactor (13) to arrive at the separator (14) after passing through the heat exchanger (11) and first trim exchanger (12), and the process comprises separating light hydrocarbon liquid and light hydrocarbon gas from heavy oil, wherein the separated heavy oil is conveyed to the reactor (13).

In another aspect, referring to FIG. 2 provided is a process for continuously upgrading heavy oil to produce upgraded oil, using a pulsed plasma reactor (23), the process including forcing heavy oil through a heavy oil feed (48) with a first pressure between 0.1 and 10 barg (preferred range of 0.9 to 2 barg) through a heat exchanger (21) and a first trim exchanger (22) and into a separator (24) and separating light hydrocarbon liquid and light hydrocarbon gas from the heavy oil, wherein separated heavy oil is flowed to the heat exchanger (21) to combine with heavy oil from the heavy oil feed (48) and/or the separated heavy oil is flowed to an inter-electrode gap included in a reactor (23), wherein the inter-electrode gap is defined by a distance between a first end of a negative electrode and a first end of a positive electrode, wherein a second end of the positive electrode and a second end of the negative electrode are connected to a power generator (27) by a power line (65), and wherein the light hydrocarbon gas is flowed to a compressor (25) or the power generator (27), wherein the light hydrocarbon gas at the compressor (25) is compressed and flowed to the reactor (23), and wherein the light hydrocarbon liquid is flowed to a blender (28) or collected. The process further includes forcing, at a second pressure between 0.2 and 20 barg (preferred range of 1 to 3 barg), a light hydrocarbon gas through a light hydrocarbon gas feed (67) and into the reactor (23) to mix with the heavy oil therein, to form a liquid hydrocarbon-gas mixture in between the inter-electrode gap. The process further includes generating a spark-discharge in the inter-electrode gap to react the liquid hydrocarbon-gas mixture. The process further includes flowing the reacted liquid hydrocarbon-gas mixture to the separator (24) and separating light hydrocarbon liquid and light hydrocarbon gas from the heavy oil. The process further includes combining separated heavy oil and heavy oil from the heavy oil feed and flowing the combined heavy oil through a second trim exchanger (26) and to the blender (28) and blending the combined heavy oil with the light hydrocarbon liquid to produce upgraded oil.

In some embodiments, the combined heavy oil from the separator (24) and heavy oil from the heavy oil feed are adjusted to a temperature of 25° C. to 200° C. In some embodiments, the combined heavy oil from the separator (24) and heavy oil from the heavy oil feed are adjusted to a temperature of 15° C. to 50° C. In some embodiments, the combined heavy oil from the separator (24) and heavy oil from the heavy oil feed are adjusted to a temperature of 50° C. to 100° C. In some embodiments, the combined heavy oil from the separator (24) and heavy oil from the heavy oil feed are adjusted to a temperature of 100° C. to 150° C. In some embodiments, the combined heavy oil from the separator (24) and heavy oil from the heavy oil feed are adjusted to a temperature of 150° C. to 200° C. with a preferred temperature of between 120 and 150° C.

In some embodiments, the combined heavy oil from the separator (24) and heavy oil from the heavy oil feed and has a viscosity of between 1 and 1,000 cP after combination. In some embodiments, the combined heavy oil from the separator (24) and heavy oil from the heavy oil feed and has a viscosity of between 1 and 50 cP after combination. In some embodiments, the combined heavy oil from the separator (24) and heavy oil from the heavy oil feed and has a viscosity of between 50 and 300 cP after combination. In some embodiments, the combined heavy oil from the separator (24) and heavy oil from the heavy oil feed and has a viscosity of between 300 and 600 cP after combination. In some embodiments, the combined heavy oil from the separator (24) and heavy oil from the heavy oil feed and has a viscosity of between 600 and 900 cP after combination. In some embodiments, the combined heavy oil from the separator (24) and heavy oil from the heavy oil feed and has a viscosity of between 900 and 1,250 cP after combination. In some embodiments, the combined heavy oil from the separator (24) and heavy oil from the heavy oil feed and has a viscosity of greater than 1,000 cP after combination. The preferred viscosity ranges between 10 and 200 cP.

In some embodiments, the reactor (23) comprises multiple inter-electrode gaps. In some embodiments, the reactor (23) comprises two inter-electrode gaps. In some embodiments, the reactor (23) comprises three inter-electrode gaps. In some embodiments, the reactor (23) comprises four inter-electrode gaps. In some embodiments, the reactor (23) comprises five inter-electrode gaps. In some embodiments, the reactor (23) comprises 5-10 inter-electrode gaps. In some embodiments, the reactor (23) comprises 20-50 inter-electrode gaps. In some embodiments, the reactor (23) comprises 50-100 inter-electrode gaps. In some embodiments, the reactor (23) comprises greater than 100 inter-electrode gaps. The preferred number of gaps will scale linearly with the desired throughput of the process application. The ancillary equipment associated with the reactions will be sized accordingly and larger applications will provide economies of scale for this equipment.

In some embodiments, the separator (24) comprises a fractional distillation apparatus or an absorber. In some embodiments, the absorber is a pressure swing absorber.

In some embodiments, the light hydrocarbon liquid has an upper boiling point between 100° C. and 300° C. In some embodiments, the light hydrocarbon liquid has an upper boiling point between 90° C. and 110° C. In some embodiments, the light hydrocarbon liquid has an upper boiling point between 110° C. and 130° C. In some embodiments, the light hydrocarbon liquid has an upper boiling point between 130° C. and 150° C. In some embodiments, the light hydrocarbon liquid has an upper boiling point between 150° C. and 170° C. In some embodiments, the light hydrocarbon liquid has an upper boiling point between 170° C. and 190° C. In some embodiments, the light hydrocarbon liquid has an upper boiling point between 190° C. and 210° C. In some embodiments, the light hydrocarbon liquid has an upper boiling point between 210° C. and 230° C. In some embodiments, the light hydrocarbon liquid has an upper boiling point between 230° C. and 250° C. In some embodiments, the light hydrocarbon liquid has an upper boiling point between 250° C. and 270° C. In some embodiments, the light hydrocarbon liquid has an upper boiling point between 270° C. and 290° C. In some embodiments, the light hydrocarbon liquid has an upper boiling point between 270° C. and 310° C. In some embodiments the light hydrocarbon liquid has an upper boiling point less than 90° C.

In some embodiments, the method further includes removing a portion of the light hydrocarbon liquid before blending it with the combined heavy oil. In some embodiments, fresh hydrogen and/or fresh hydrocarbon gas is added to the separated light hydrocarbon gas before and/or after it is compressed.

In some embodiments, the process comprises analyzing the light hydrocarbon gas composition before flowing it to the reactor (23). In some embodiments, the analysis is by colorimetric analysis. In some embodiments, the analysis is by gas chromatography (GC). In some embodiments, the analysis is by gas chromatography mass spectrometry (GCMS). In some embodiments, the analysis is by gas density, gas molecular weight, or other measurement techniques to determine gas composition, either directly or indirectly.

In some embodiments, the process further includes purging the compressed light hydrocarbon gas to control pressure. In some embodiments, the purged light hydrocarbon gas provides power to the reactor (23) and/or provides heat used in the process. In some embodiments, hydrogen is recovered from the purged light hydrocarbon gas. In some embodiments, a microturbine provides energy for the spark-discharge.

In some embodiments, the amount of fresh hydrogen added to the light hydrocarbon gas is an amount sufficient to provide a hydrogen-light hydrocarbon gas mixture comprising a hydrogen concentration between 1% and 50% by volume. In some embodiments, the hydrogen concentration between 1% and 10% by volume. In some embodiments, the hydrogen concentration between 10% and 20% by volume. In some embodiments, the hydrogen concentration between 20% and 30% by volume. In some embodiments, the hydrogen concentration between 30% and 40% by volume. In some embodiments, the hydrogen concentration between 40% and 50% by volume. In some embodiments, the hydrogen concentration between 50% and 60% by volume. In some embodiments, the hydrogen concentration between 60% and 80% by volume. In some embodiments, the hydrogen concentration is greater than 80% by volume.

In some embodiments the hydrogen-light hydrocarbon gas mixture is provided to the reactor at a flow rate between 0.01 to 1 L/min. In some embodiments the hydrogen-light hydrocarbon gas mixture is provided to the reactor at a flow rate between 0.01 to 0.2 L/min. In some embodiments the hydrogen-light hydrocarbon gas mixture is provided to the reactor at a flow rate between 0.2 to 0.4 L/min. In some embodiments the hydrogen-light hydrocarbon gas mixture is provided to the reactor at a flow rate between 0.4 to 0.6 L/min. In some embodiments the hydrogen-light hydrocarbon gas mixture is provided to the reactor at a flow rate between 0.6 to 0.8 L/min. In some embodiments the hydrogen-light hydrocarbon gas mixture is provided to the reactor at a flow rate between 0.8 to 1 L/min. In some embodiments the hydrogen-light hydrocarbon gas mixture is provided to the reactor at a flow rate greater than 1 L/min.

In some embodiments, the upgraded oil has an improved boiling curve as indicated by the conversion. Conversion is defined as the amount of new material boiling below 400 C that is created during the reactions divided by the total initial mass. In some embodiments, conversion may be defined by new material created that boils below 300 C, or some other temperature. The upgraded oil will also have an improved API gravity of between, 0.1 and 20. The upgraded oil will have an improved asphaltene content of between 0 and 10%. The preferred ranges of the conversion, API improvement, and asphaltene reduction will depend on the specific application and relative values of the feed and products.

In some embodiments, the heat exchanger (21) is bypassed by the heavy oil from the heavy oil feed (48) and/or the heavy oil from the separator (24). In some embodiments, the first trim exchanger (22) and/or the second trim exchanger (26) is bypassed by the heavy oil from the heavy oil feed (48) and/or the heavy oil from the separator (24).

In some embodiments, the heavy oil being forced through the heavy oil feed (31) is cooled by the heat exchanger (21) and the first trim exchanger (22). In some embodiments the heat exchanger (21) cools heavy oil. In some embodiments, the heat exchanger (21) heats heavy oil. In some embodiments heat exchanger (21) may be bypassed by the line passing through it.

In some embodiments the first trim exchanger (22) heats heavy oil passing through it. In some embodiments the first trim exchanger (22) cools heavy oil passing through it. In some embodiments the second trim exchanger (26) heats heavy oil passing through it. In some embodiments the second trim exchanger (26) cools heavy oil passing through it.

The apparatus and processes thus generally described above, will be further understood by reference to the following examples, which are not intended to be limiting of the apparatus or processes described above in any manner.

Examples

In a first example, with reference to FIG. 1, a heavy refinery oil stream, such as atmospheric residue, hydrocracker unconverted oil, and or other heavy gas oil is fed into the process and the heat exchanger and trim exchanger maintain an appropriate temperature on the feed to the reactor of between 100 C and 200 C. This temperature van vary depending on the composition of the liquid with the intention of producing a low enough viscosity to maintain small bubble size. The gas feed may be any light refinery gas free of oxygen and sulfur. The spark discharge reactions will produce lighter fuel range products that may be removed in the separator and sent to other units for further processing and blending. A portion of the heavy liquid product from the separator may also be recycled back to the reactor to increase the overall conversion of the feed. A portion of the recycle gas from the separator may be removed to be used as fuel for a power source that provides electricity for the spark discharges and other process equipment.

In a second example, with reference to FIG. 2, a diluted heavy crude oil stream is fed into the process through the heat exchanger and trim exchanger to maintain an appropriate temperature in the bottom of the separator. The existing light material (diluent) is removed in the separator, and the heavy material is passed to the reactor at a temperature that will produce a low liquid viscosity that maintains small bubble size. The gas feed may be natural gas or associated produced gas that does not contain oxygen. The spark discharge reactions will produce lighter hydrocarbon products that may be blended to improve the crude oil transport properties and/or removed as a light product. A portion of the heavy liquid product from the separator may also be removed and blended to improve the quality of the crude oil. A portion of the recycle gas from the separator may be removed to be used as fuel for a power source that provides electricity for the spark discharges and other process equipment.

The invention is further defined by the following embodiments:

Embodiment A. An apparatus for continuously upgrading the quality of heavy oil, the apparatus comprising: a heavy oil feed connected to a heat exchanger for conveying heavy oil through the heat exchanger, wherein the heavy oil feed is continuous with a first line connecting the heat exchanger with a first trim exchanger; a reactor with a second line configured to deliver heavy oil thereto, wherein the second line runs through the first trim exchanger and is continuous with the first line; a separator connected to the reactor by a third line, wherein the separator is connected to a fourth line that splits into a recycling line and a fifth line, wherein the recycling line merges with the second line, and the fifth line connects to the heat exchanger, and wherein a sixth line is connected to the separator and splits into a produced light liquids line and a seventh line, wherein the seventh line connects to a blender; a second trim exchanger, connected to the heat exchanger by an eighth line, wherein the eighth line is continuous with the fifth line; a ninth line connecting the blender and the second trim exchanger; an upgraded oil line connected to the blender, for removing upgraded oil from the apparatus; a compressor, wherein a tenth line is connected to the separator and splits into a recycle gas line and an eleventh line, wherein the recycle gas line connects to the compressor and the eleventh line connects to a power generator; a light hydrocarbon gas feed for conveying fresh light hydrocarbon gas to the reactor; a twelfth line connecting the compressor to the light hydrocarbon gas feed; and a power line connecting the power generator to the reactor.

Embodiment B. An apparatus for continuously upgrading heavy oil to produce upgraded oil, the apparatus comprising: a heavy oil feed connected to a heat exchanger for conveying heavy oil through the heat exchanger, wherein the heavy oil feed is continuous with a first line connecting the heat exchanger with a first trim exchanger; a separator connected to the first trim exchanger by a second line, wherein the second line is continuous with the first line; a third line connected to the separator, wherein the third line branches into a heavy oil line and a fourth line, wherein the heavy oil line runs through the heat exchanger and is continuous with a fifth line connected to a second trim exchanger, and wherein the fourth line connects to a reactor, wherein a sixth line connects the reactor with the separator; a blender connected to the second trim exchanger by a seventh line, wherein an upgraded oil line for removing upgraded oil from the apparatus is connected to the blender; an eighth line connected to the separator wherein the eighth line branches into a light hydrocarbon liquid line and a produced light liquid line, wherein the light hydrocarbon liquid line connects to the blender; a ninth line connected to the separator, wherein the ninth line branches into a tenth line and a recycle gas line, wherein the tenth line is connected to a power generator, and wherein the recycle gas line is connected to a compressor, wherein the compressor is connected to an eleventh line, wherein the eleventh line merges with a light hydrocarbon gas feed, wherein the light hydrocarbon gas feed is configured to convey fresh light hydrocarbon gas to the reactor; and a power line connecting the power generator to the reactor.

Embodiment C. A process for continuously upgrading heavy oil to produce upgraded oil, using a pulsed plasma reactor, the process comprising: forcing heavy oil through a heavy oil feed under a first pressure between 0.1 and 10 barg (preferred range of 0.9 to 2 barg) to an inter-electrode gap inside of the reactor, wherein the heavy oil feed first passes the heavy oil through a heat exchanger to adjust the temperature of the heavy oil and arrive at a first trim exchanger wherethrough the heavy oil passes to arrive at the reactor, and wherein the inter-electrode gap is defined by a distance between a first end of a negative electrode and a first end of a positive electrode, wherein a second end of the positive electrode and a second end of the negative electrode are connected to a power generator by a power line; forcing, at a second pressure between 0.2 and 20 barg (preferred range of 1 to 3 barg), a light hydrocarbon gas through a light hydrocarbon gas feed and into the reactor to mix with the heavy oil therein, to form a liquid hydrocarbon-gas mixture in between the inter-electrode gap; generating a spark-discharge in the inter-electrode gap to react the liquid hydrocarbon-gas mixture; flowing reacted liquid hydrocarbon-gas mixture into a separator and separating light hydrocarbon liquid and light hydrocarbon gas from heavy oil; flowing the separated light hydrocarbon gas from the separator to a compressor and compressing the light hydrocarbon gas, wherein fresh hydrogen and fresh hydrocarbon gas is added to the light hydrocarbon gas to produce a hydrogen-light hydrocarbon gas mixture and recycling the hydrogen-light hydrocarbon gas mixture to the reactor; flowing heavy oil from the separator to the heat exchanger wherein the heavy oil from the separator combines with heavy oil from the heavy oil feed to produce combined heavy oil; and removing the combined heavy oil or blending the combined heavy oil with the light hydrocarbon liquid to produce upgraded oil.

Embodiment D. The process of Embodiment C, wherein 1% to 50% of the volume of the heavy oil is converted to light hydrocarbon liquid and/or light hydrocarbon gas with a preferred range of between 3 and 30%.

Embodiment E. The process of Embodiment C or D, wherein the heavy oil from the separator and heavy oil from the heavy oil feed are combined at a ratio of 1:10 to 20:1 with a preferred ratio of between 1:1 and 10:1.

Embodiment F. The process of any of Embodiments C-E, wherein the combined heavy oil from the separator and heavy oil from the heavy oil feed are adjusted to a temperature of 25° C. to 200° C. and a viscosity of between 1 and 1,000 cP upon entry to the reactor with a preferred viscosity of between 10 and 200 cP.

Embodiment G. The process of any of Embodiments C-F, wherein the reactor comprises multiple inter-electrode gaps.

Embodiment H. The process of any of Embodiments C-G, wherein the separator comprises a fractional distillation apparatus or an absorber.

Embodiment I. The process of any of Embodiments C-H, wherein the absorber is a pressure swing absorber.

Embodiment J. The process of any of Embodiments C-I, wherein the light hydrocarbon liquid has an upper boiling point between 100° C. and 300° C.

Embodiment K. The process of any of Embodiments C-J, further comprising removing a portion of the light hydrocarbon liquid before blending it with the combined heavy oil.

Embodiment L. The process of any of Embodiments C-K, wherein fresh hydrogen and/or fresh hydrocarbon gas is added to the separated light hydrocarbon gas before and/or after it is compressed.

Embodiment M. The process of any of Embodiments C-L, further comprising analyzing the light hydrocarbon gas composition before flowing it to the reactor.

Embodiment N. The process of any of Embodiments C-M, further comprising purging the compressed light hydrocarbon gas.

Embodiment O. The process of any of Embodiments C-N, wherein the purged light hydrocarbon gas provides power to the reactor and/or provides heat used in the process.

Embodiment P. The process of any of Embodiments C-O, wherein hydrogen is recovered from the purged light hydrocarbon gas.

Embodiment Q. The process of any of Embodiments C-P, wherein a microturbine provides energy for the spark-discharge.

Embodiment R. The process of any of Embodiments C-Q, wherein the amount of fresh hydrogen added to the light hydrocarbon gas is an amount sufficient to provide a hydrogen-light hydrocarbon gas mixture comprising a hydrogen concentration between 1% and 65% by volume with a preferred concentration of between 10 and 50% hydrogen.

Embodiment S. The process of any of Embodiments C-R, wherein the hydrogen-light hydrocarbon gas mixture is provided to the reactor at a flow rate between 0.01 to 1 L/min.

Embodiment T. The process of any of Embodiments C-S, wherein the upgraded oil has an improved boiling curve as indicated by the conversion.

Embodiment U. The process of any of Embodiments C-T, wherein the heat exchanger is bypassed by the heavy oil.

Embodiment V. The process of any of Embodiments C-U, wherein the first trim exchanger and/or the second trim exchanger is bypassed by the heavy oil.

Embodiment W. The process of any of Embodiments C-V, wherein the heavy oil being forced through the heavy oil feed is cooled by the heat exchanger and the first trim exchanger.

Embodiment X. The process of any of Embodiments C-W, wherein the heavy oil feed comprises heavy oil that does not require upgrading, and wherein the heavy oil feed bypasses the reactor to arrive at the separator after passing through the heat exchanger and first trim exchanger, and the process comprises separating light hydrocarbon liquid and light hydrocarbon gas from heavy oil, wherein the separated heavy oil is conveyed to the reactor.

Embodiment Y. A process for continuously upgrading heavy oil to produce upgraded oil, using a pulsed plasma reactor, the process comprising: forcing heavy oil through a heavy oil feed with a first pressure between 0.1 and 10 barg (preferred range of 0.9 to 2 barg) through a heat exchanger and a first trim exchanger and into a separator and separating light hydrocarbon liquid and light hydrocarbon gas from the heavy oil, wherein separated heavy oil is flowed to the heat exchanger to combine with heavy oil from the heavy oil feed and/or the separated heavy oil is flowed to an inter-electrode gap comprised in the reactor, wherein the inter-electrode gap is defined by a distance between a first end of a negative electrode and a first end of a positive electrode, wherein a second end of the positive electrode and a second end of the negative electrode are connected to a power generator by a power line, and wherein the light hydrocarbon gas is flowed to a compressor or the power generator, wherein the light hydrocarbon gas at the compressor is compressed and flowed to the reactor, and wherein the light hydrocarbon liquid is flowed to a blender or collected; forcing, at a second pressure between 0.2 and 20 barg (preferred range of 1 to 3 barg), a light hydrocarbon gas through a light hydrocarbon gas feed and into the reactor to mix with the heavy oil therein, to form a liquid hydrocarbon-gas mixture in between the inter-electrode gap; generating a spark-discharge in the inter-electrode gap to react the liquid hydrocarbon-gas mixture; flowing the reacted liquid hydrocarbon-gas mixture to the separator and separating light hydrocarbon liquid and light hydrocarbon gas from the heavy oil; combining separated heavy oil and heavy oil from the heavy oil feed and flowing the combined heavy oil through a second trim exchanger and to the blender and blending the combined heavy oil with the light hydrocarbon liquid to produce upgraded oil.

Embodiment Z. The process of Embodiment Y, wherein 1% to 50% of the volume of the heavy oil is converted to light hydrocarbon liquid and/or light hydrocarbon gas with a preferred range of between 3 and 30%.

Embodiment AA. The process of Embodiment Y or Z, wherein the heavy oil from the separator and heavy oil from the heavy oil feed are combined at a ratio of 1:10 to 20:1 with a preferred range of between 1:1 and 1:10.

Embodiment BB. The process of any of Embodiments Y-AA, wherein the combined heavy oil is adjusted to a temperature of 25° C. to 200° C. and has a viscosity of between 1 and 1,000 cP after combination with a preferred range of between 10 and 200 cP.

Embodiment CC. The process of any of Embodiments Y-BB, wherein the reactor comprises multiple inter-electrode gaps.

Embodiment DD. The process of any of Embodiments Y-CC, wherein the separator comprises a fractional distillation apparatus or an absorber.

Embodiment EE. The process of any of Embodiments Y-DD, wherein the absorber is a pressure swing absorber.

Embodiment FF. The process of any of Embodiments Y-EE, wherein the light hydrocarbon liquid has an upper boiling point between 100° C. and 300° C.

Embodiment GG. The process of any of Embodiments Y-FF, further comprising removing a portion of the light hydrocarbon liquid before blending it with the combined heavy oil.

Embodiment HH. The process of any of Embodiments Y-GG, wherein fresh hydrogen and/or fresh hydrocarbon gas is added to the separated light hydrocarbon gas before and/or after it is compressed.

Embodiment II. The process of any of Embodiments Y-HH, further comprising analyzing the light hydrocarbon gas composition before flowing it to the reactor.

Embodiment JJ. The process of any of Embodiments Y-II, further comprising purging the compressed light hydrocarbon gas.

Embodiment KK. The process of any of Embodiments Y-JJ, wherein the purged light hydrocarbon gas provides power to the reactor and/or provides heat used in the process.

Embodiment LL. The process of any of Embodiments Y-KK, wherein hydrogen is recovered from the purged light hydrocarbon gas.

Embodiment MM. The process of any of Embodiments Y-LL, wherein a microturbine provides energy for the spark-discharge.

Embodiment NN. The process of any of Embodiments Y-MM, wherein the amount of fresh hydrogen added to the light hydrocarbon gas is an amount sufficient to provide a hydrogen-light hydrocarbon gas mixture comprising a hydrogen concentration between 1% and 65% by volume with a preferred concentration of between 10 and 50% hydrogen.

Embodiment OO. The process of any of Embodiments Y-NN, wherein the hydrogen-light hydrocarbon gas mixture is provided to the reactor at a flow rate between 0.01 to 1 L/min.

Embodiment PP. The process of any of Embodiments Y-OO, wherein the upgraded oil has an improved boiling curve as indicated by the conversion.

Embodiment QQ. The process of any of Embodiments Y-PP, wherein the heat exchanger is bypassed by the heavy oil from the heavy oil feed and/or the heavy oil from the separator.

Embodiment RR. The process of any of Embodiments Y-QQ, wherein the first trim exchanger and/or the second trim exchanger is bypassed by the heavy oil.

Embodiment SS. The process of any of Embodiments Y-RR, wherein the heavy oil being forced through the heavy oil feed is cooled by the heat exchanger and the first trim exchanger.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising', 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language including, but not limited to, 'up to,' 'at least,' 'greater than,' 'less than,' and the like, include the number recited and refer to ranges which can be subsequently broken down into sub-ranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A process for continuously upgrading heavy oil to produce upgraded oil, using a pulsed plasma reactor, the process comprising:

forcing heavy oil through a heavy oil feed under a first pressure between 0.1 and 10 barg to an inter-electrode gap inside of the reactor, wherein the heavy oil feed first passes the heavy oil through a heat exchanger to adjust the temperature of the heavy oil and arrive at a first trim exchanger wherethrough the heavy oil passes to arrive at the reactor, and wherein the inter-electrode gap is defined by a distance between a first end of a negative electrode and a first end of a positive electrode, wherein a second end of the positive electrode and a second end of the negative electrode are connected to a power generator by a power line;

forcing, at a second pressure between 0.2 and 20 barg, a light hydrocarbon gas through a light hydrocarbon gas feed and into the reactor to mix with the heavy oil therein, to form a liquid hydrocarbon-gas mixture in between the inter-electrode gap;

generating a spark-discharge in the inter-electrode gap to react the liquid hydrocarbon-gas mixture;

flowing reacted liquid hydrocarbon-gas mixture into a separator and separating light hydrocarbon liquid and light hydrocarbon gas from heavy oil;

flowing the separated light hydrocarbon gas from the separator to a compressor and compressing the light hydrocarbon gas, wherein fresh hydrogen and fresh hydrocarbon gas is added to the light hydrocarbon gas to produce a hydrogen-light hydrocarbon gas mixture and recycling the hydrogen-light hydrocarbon gas mixture to the reactor;

flowing heavy oil from the separator to the heat exchanger wherein the heavy oil from the separator combines with heavy oil from the heavy oil feed to produce combined heavy oil; and removing the combined heavy oil or blending the combined heavy oil with the light hydrocarbon liquid to produce upgraded oil.

2. The process of claim 1, wherein 1% to 50% of the volume of the heavy oil is converted to light hydrocarbon liquid and/or light hydrocarbon gas.

3. The process of claim 1, wherein the heavy oil from the separator and heavy oil from the heavy oil feed are combined at a ratio of 1:10 to 20:1.

4. The process of claim 1, wherein the combined heavy oil from the separator and heavy oil from the heavy oil feed are adjusted to a temperature of 25° C. to 200° C. and a viscosity of between 1 and 1,000 cP upon entry to the reactor.

5. The process of claim 1, wherein the reactor comprises multiple inter-electrode gaps.

6. The process of claim 1, wherein the separator comprises a fractional distillation apparatus or an absorber.

7. The process of claim 6, wherein the absorber is a pressure swing absorber.

8. The process of claim 1, wherein the light hydrocarbon liquid has an upper boiling point between 100° C. and 300° C.

9. The process of claim 1, further comprising removing a portion of the light hydrocarbon liquid before blending it with the combined heavy oil.

10. The process of claim 1, wherein fresh hydrogen and/or fresh hydrocarbon gas is added to the separated light hydrocarbon gas before and/or after it is compressed.

11. The process of claim 1, further comprising analyzing the light hydrocarbon gas composition before flowing it to the reactor.

12. The process of claim 1, further comprising purging the compressed light hydrocarbon gas.

13. The process of claim 12, wherein the purged light hydrocarbon gas provides power to the reactor and/or provides heat used in the process.

14. The process of claim 12, wherein hydrogen is recovered from the purged light hydrocarbon gas.

15. The process of claim 1, wherein a microturbine provides energy for the spark-discharge.

16. The process of claim 10, wherein the amount of fresh hydrogen added to the light hydrocarbon gas is an amount sufficient to provide a hydrogen-light hydrocarbon gas mixture comprising a hydrogen concentration between 1% and 65% by volume.

17. The process of claim 16, wherein the hydrogen-light hydrocarbon gas mixture is provided to the reactor at a flow rate between 0.01 to 1 L/min.

18. The process of claim 1, wherein the upgraded oil has an improved boiling curve as indicated by the conversion.

19. The process of claim 1, wherein the heat exchanger is bypassed by the heavy oil.

* * * * *

UNITED STATES PATENT AND TRADEMARK OFFICE
CERTIFICATE OF CORRECTION

| | | |
|---|---|---|
| PATENT NO. | : 11,713,421 B2 | Page 1 of 1 |
| APPLICATION NO. | : 17/048637 | |
| DATED | : August 1, 2023 | |
| INVENTOR(S) | : Howard Jemison, David Staack and Kunpeng Wang | |

It is certified that error appears in the above-identified patent and that said Letters Patent is hereby corrected as shown below:

On the Title Page

"(73) Assignee: The Texas A&M University System,
College Station, TX (US)"

Should read:
-- (73) Assignees: The Texas A&M University System,
College Station, TX (US);
LTEOIL LLC,
Houston, TX (US) --

Signed and Sealed this
Twelfth Day of November, 2024

Katherine Kelly Vidal
*Director of the United States Patent and Trademark Office*